(12) United States Patent
Sander et al.

(10) Patent No.: US 6,240,805 B1
(45) Date of Patent: Jun. 5, 2001

(54) COUNTERBEARING FOR A SPRING OF A SELECTOR LEVER ASSEMBLY AND METHOD OF MAKING SAME

(75) Inventors: Edmund Sander, Leonberg; Sven Hartnigk, Remseck/N., both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/376,345

(22) Filed: Aug. 18, 1999

(30) Foreign Application Priority Data

Sep. 26, 1998 (DE) .............................................. 198 44 278

(51) Int. Cl.[7] ...................................................... G05G 9/00
(52) U.S. Cl. ............................................ 74/538; 74/473.1
(58) Field of Search ................................... 74/538, 473.1, 74/527

(56) References Cited

U.S. PATENT DOCUMENTS

| 1,466,839 | * | 3/1923 | Klee | ........................................ | 74/538 |
|---|---|---|---|---|---|
| 4,733,214 | * | 3/1988 | Andreson | ............................. | 338/128 |
| 4,884,668 | * | 12/1989 | Kobayashi et al. | ...................... | 192/4 |
| 5,493,932 | * | 2/1996 | Plocher | ................................. | 74/483 |
| 5,542,150 | * | 8/1996 | Tu | ......................................... | 16/115 |
| 5,577,418 | * | 11/1996 | Traxler et al. | ........................ | 74/528 |

FOREIGN PATENT DOCUMENTS

3927922C2    6/1995   (DE) .

* cited by examiner

*Primary Examiner*—David A. Bucci
*Assistant Examiner*—Vicky A. Johnson
(74) *Attorney, Agent, or Firm*—Evenson, McKeown, Edwards & Lenahan, P.L.L.C.

(57) ABSTRACT

A counterbearing for a spring is used to support an actuating element for a latching device of a selector lever. To facilitate assembly, the counterbearing is made table-shaped and includes a plate with laterally formed spreading arms. The spreading arms are provided endwise with latching noses which are received by openings in a lower part of the selector lever with essentially parallel walls.

21 Claims, 1 Drawing Sheet

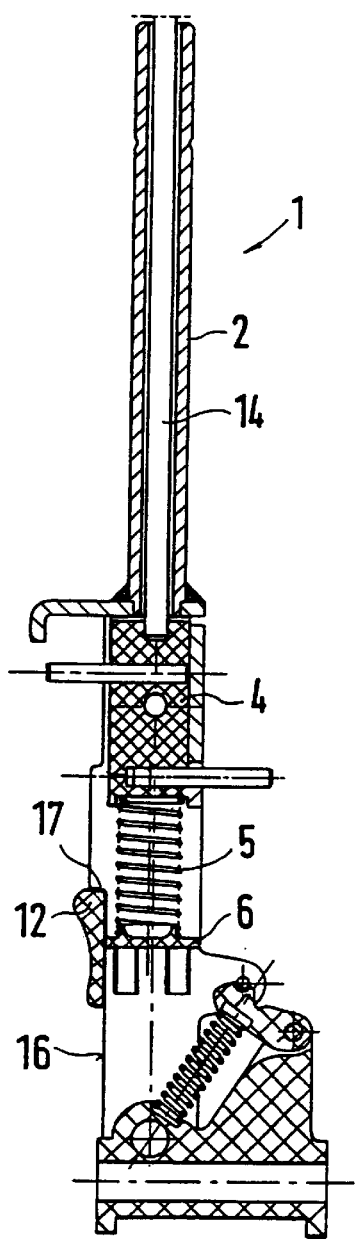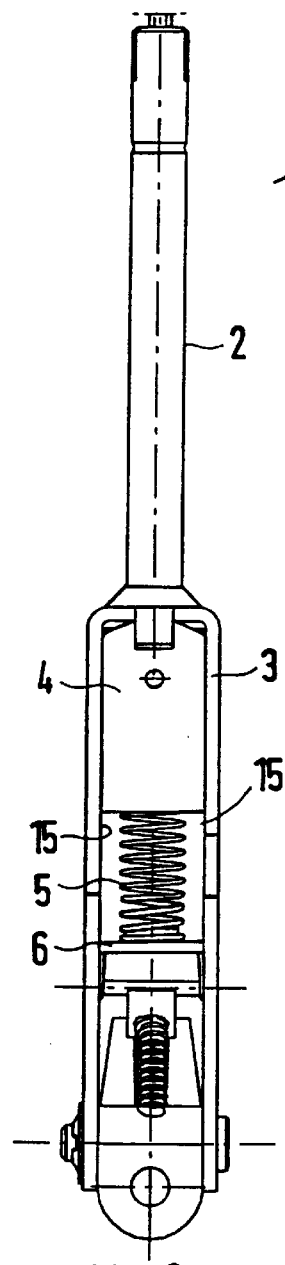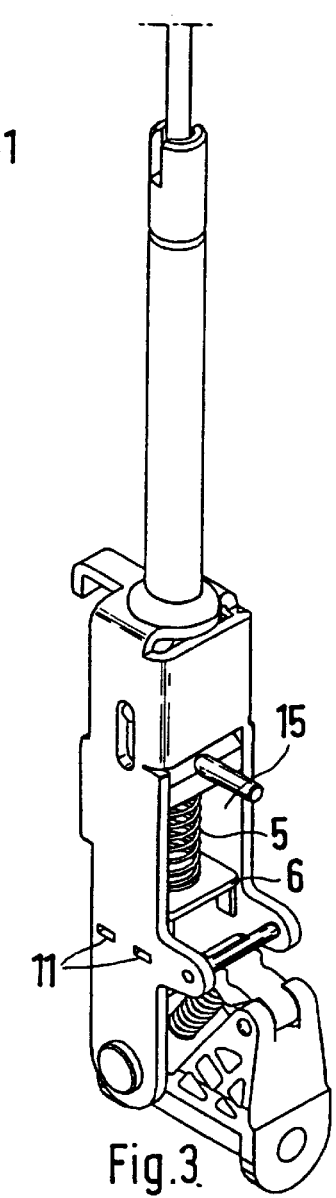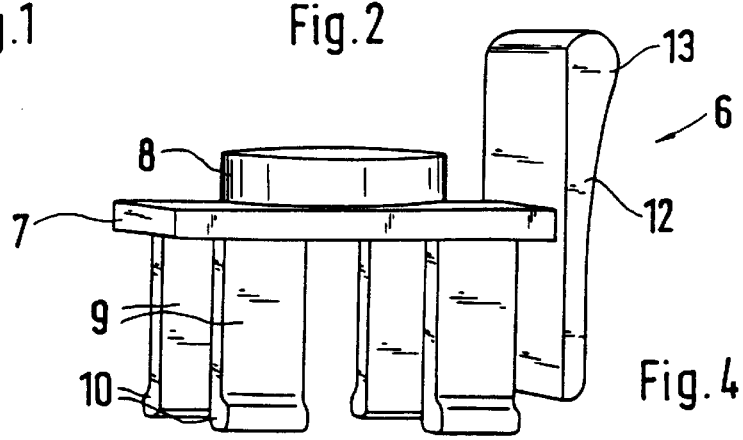
Fig.1
Fig.2
Fig.3
Fig.4

COUNTERBEARING FOR A SPRING OF A SELECTOR LEVER ASSEMBLY AND METHOD OF MAKING SAME

BACKGROUND AND SUMMARY OF THE INVENTION

This application claims the priority of German application 198 44 278.5, filed in Germany on Sep. 26, 1998 the disclosure of which is expressly incorporated by reference herein.

The invention relates to a counterbearing for a spring as used to support an actuating element of a latching device of a selector lever.

As disclosed for example in German Patent Document No. DE 39 27 922 A1, known counterbearings are permanently formed on the selector lever.

In contrast to this prior art, a goal of the invention is to provide a counterbearing for a spring that is simplified in terms of its assembly.

This goal is achieved according to the invention by providing a counterbearing for a spring for supporting an actuating element for a latching device on a selector lever having parallel walls on its lower part, wherein the counterbearing is designed as a first plate on which projections are shaped laterally, said projections being provided endwise with latching noses engageable in openings provided in the walls to receive the latching noses.

For simplifying the assembly of the counterbearing, it is proposed to make the counterbearing as a plate on which projections with latching noses located endwise are provided. To receive the plate, a lower part of the selector lever has essentially parallel walls in which openings are provided to receive the latching noses. The assembly of such a counterbearing is also still possible at a later point in time during assembly so that the spring need not be installed during the previous assembly steps of the selector lever and/or is not under pretension, and so the assembly process is simplified. Due to the fact that latching noses are provided on it as fastening means, during the assembly of the counterbearing the pretensioning force of the spring does not have to be supported during the fastening process but the counterbearing can be installed in a single assembly step instead by inserting it between the parallel walls.

Other advantageous features of preferred embodiments of the invention are described below and in the claims.

Thus it is proposed to provide on the top of the plate a device to receive a foot area of the spring. By this measure, the spring is connected with the counterbearing and the spring does not have to be held separately when the counterbearing is installed, further facilitating assembly.

It is also proposed to form a second plate beside the first plate and to provide essentially parallel end faces laterally on the walls, along which faces the second plate can slide as it rests flat against them. The second plate is designed so that it rests essentially flat on the end faces in the assembly position of the first plate. In this way, the assembly of the counterbearing is further simplified since only the second plate must rest flat against the end faces for correct alignment of the latching noses relative to the openings in the walls and then must be moved against the force of the spring until the latching noses engage the openings in the walls. The assembly process can be further facilitated by providing a handle, for example a groove for the thumb, on the top of the second plate.

Finally, stops can be provided on the walls corresponding to the first plate or stops can be provided on the end faces corresponding to the second plate that prevent movement of the counterbearing against the force of the spring beyond the assembly position and thus increase the reliability of assembly.

Other objects, advantages and novel features of the present invention will become apparent from the following detailed description of the invention when considered in conjunction with the accompanying drawings.

BRIEF DESCRIPTION OF THE DRAWINGS

FIG. 1 is a section through a selector lever with an installed counterbearing, constructed according to a preferred embodiment of the present invention;

FIG. 2 is a rear view of the selector lever according to FIG. 1;

FIG. 3 is a diagonal view of the selector lever according to FIG. 1; and

FIG. 4 is a detailed view of the counterbearing of the selector lever.

DETAILED DESCRIPTION OF THE DRAWINGS

A selector lever 1 shown in FIG. 1 includes a tubular upper part 2 and a forked lower part 3. An actuating rod 14 is guided within upper part 2, said rod being connected with a slide. In order to hold the actuating rod 14 and slide 4 in the resting position shown, a pretensioned spring 5 is located below slide 4. Spring 5 abuts a table-shaped counterbearing 6 which is secured on the essentially parallel walls 15 of lower part 3.

As shown in FIG. 4, the table-shaped counterbearing 6 consists of a first plate 7 on whose top a ring 8 is formed to receive a foot area of spring 5. For this purpose, the outside diameter of the ring 8 is made slightly larger than the inside diameter of spring 5 so that spring 5 is securely held on ring 8. On the underside of first plate 7, projections 9 in the shape of spreading arms are provided, said projections being provided endwise with latching noses 10. The size of the first plate 7 is chosen so that it is guided flush within the fork-shaped lower part 3 and the spreading arms 9 abut the lateral walls 15 of lower part 3. In the installation position shown in FIG. 1, the latching noses 10 engage recesses 11 in the lateral walls 15 and thus secure the counterbearing 6 against the force of the spring once in position.

During the assembly of counterbearing 6, the pretensioning force of spring 5 must be applied simultaneously. In order to facilitate this task, a second plate 12 is located on counterbearing 6 laterally as an insertion aid. The second plate 12 slides on the end faces 16 of the side walls 15 during the assembly of counterbearing 6 and is located on counterbearing 6 so that when the second plate 12 is applied flat, the latching noses 10 enter the recesses 11. A thickening 13 is provided endwise on the second plate 12 as a handle, in order to facilitate the application of the pretensioning force for the spring 5. Instead of the thickening, a depression can be machined into the second plate 12. Finally, projections 17 are provided on the end faces 16 that prevent a shifting of second plate 12 and hence of counterbearing 6 beyond the installation position. Such stops can also be provided on walls 15 and act on the first plate 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selector lever assembly comprising:

a selector lever having parallel walls on its lower part, and a counterbearing for a spring for supporting an actuating element for a latching device on the selector lever, wherein the counterbearing is designed as a first plate on which projections are shaped laterally, said projections being provided endwise with latching noses engageable in openings provided in the walls to receive the latching noses, wherein a second plate is shaped laterally on the first plate, and wherein the walls have essentially Parallel end faces on which the second plate can slide, with the second plate being designed so that it rests flat on the end faces in the assembly position of the first plate in which the latching noses engage the openings in the walls.

2. An assembly according to claim 1, wherein a device to receive a foot area of the spring is provided on the top of the first plate.

3. An assembly according to claim 2, wherein one or more stops for the first plate are provided on the walls.

4. Counterbearing according to claim 3, wherein one or more stops for the second plate are provided on end faces of the walls.

5. An assembly according to claim 2, wherein one or more stops for the second plate are provided on end faces of the walls.

6. An assembly according to claim 1, wherein a handle is provided on the top of the second plate.

7. An assembly according to claim 6, wherein one or more stops for the first plate are provided on the walls.

8. An assembly according to claim 6, wherein one or more stops for the second plate are provided on end faces of the walls.

9. An assembly according to claim 1, wherein one or more stops for the first plate are provided on the walls.

10. An assembly according to claim 9 wherein a handle is provided on the top of the second plate.

11. An assembly according to claim 1, wherein one or more stops for the second plate are provided on end faces of the walls.

12. A motor vehicle selector lever assembly comprising:

an actuating rod connected to a slide, a selector lever having a tubular upper part for guiding the actuating rod and a forked lower part with spaced parallel walls, a pretensioned spring disposed below the slide and operable to hold the actuating rod and slide in a rest position, and a counterbearing for the spring, said counterbearing being secured on the walls, wherein the counterbearing is designed as a first plate on which projections are shaped laterally, said projections being provided endwise with latching noses engageable in openings provided in the walls to receive the latching noses.

13. An assembly according to claim 12, wherein a device to receive a foot area of the spring is provided on the top of the first plate.

14. An assembly according to claim 12, wherein a second plate is shaped laterally on the first plate, and wherein the walls have essentially parallel end faces on which the second plate can slide, with the second plate being designed so that it rests flat on the end faces in the assembly position of the first plate in which the latching noses engage the openings in the walls.

15. An assembly according to claim 14, wherein a handle is provided on the top of the second plate.

16. An assembly according to claim 12, wherein one or more stops for the first plate are provided on the walls.

17. An assembly according to claim 14, wherein one or more stops for the second plate are provided on end faces of the walls.

18. An assembly according to claim 13, wherein a second plate is shaped laterally on the first plate, and wherein the walls have essentially parallel end faces on which the second plate can slide, with the second plate being designed so that it rests flat on the end faces in the assembly position of the first plate in which the latching noses engage the openings in the walls.

19. An assembly according to claim 18, wherein a handle is provided on the top of the second plate.

20. An assembly according to claim 19, wherein one or more stops for the first plate are provided on the walls.

21. An assembly according to claim 20, wherein one or more stops for the second plate are provided on end faces of the walls.

* * * * *